(12) United States Patent
Wood et al.

(10) Patent No.: US 10,350,806 B2
(45) Date of Patent: Jul. 16, 2019

(54) APPARATUS AND METHOD FOR FORMING A POLYMERIC WEB

(71) Applicant: Poly-America, L.P., Grand Prairie, TX (US)

(72) Inventors: Gregory James Wood, Carrollton, TX (US); Brad A. Cobler, Irving, TX (US)

(73) Assignee: Poly-America, L.P., Grand Prairie, TX (US)

( * ) Notice: Subject to any disclaimer, the term of this patent is extended or adjusted under 35 U.S.C. 154(b) by 574 days.

(21) Appl. No.: 15/075,689

(22) Filed: Mar. 21, 2016

(65) Prior Publication Data
US 2017/0266860 A1  Sep. 21, 2017

(51) Int. Cl.
| | | |
|---|---|---|
| *B29C 48/08* | (2019.01) | |
| *B29C 48/25* | (2019.01) | |
| *B29C 48/30* | (2019.01) | |
| *B29C 48/025* | (2019.01) | |
| *B29C 48/32* | (2019.01) | |
| *B29C 48/335* | (2019.01) | |
| *B29C 48/88* | (2019.01) | |

(Continued)

(52) U.S. Cl.
CPC .......... *B29C 48/08* (2019.02); *B29C 48/0255* (2019.02); *B29C 48/25* (2019.02); *B29C 48/30* (2019.02); *B29C 48/32* (2019.02); *B29C 48/335* (2019.02); *B29C 48/912* (2019.02); *B29C 48/0015* (2019.02); *B29C 48/0018* (2019.02); *B29C 48/10* (2019.02); *B29C 48/17* (2019.02); *B29C 48/21* (2019.02); *B29C 48/362* (2019.02); *B29C 48/387* (2019.02); *B29C 48/70* (2019.02); *B29K 2023/04* (2013.01); *B29L 2007/008* (2013.01); *B29L 2009/00* (2013.01)

(58) Field of Classification Search
CPC ............ B29C 47/0021; B29C 47/0026; B29C 47/005; B29C 47/0052; B29C 47/04; B29C 47/043; B29C 47/046; B29C 47/06; B29C 47/065
See application file for complete search history.

(56) References Cited

U.S. PATENT DOCUMENTS

| | | | | |
|---|---|---|---|---|
| 3,600,918 A | * | 8/1971 | Lemelson | ............. B29C 43/222 264/132 |
| 3,649,143 A | * | 3/1972 | Papesh | ................ B29C 47/0023 425/114 |

(Continued)

OTHER PUBLICATIONS

Perry et al., "Die Design Tips for Blown Film Coextrusion," Plastics Technology, Feb. 1990, pp. 93-96.

*Primary Examiner* — Monica A Huson
*Assistant Examiner* — Kelsey C Grace
(74) *Attorney, Agent, or Firm* — Daniel J. Layden; Brandon J. Lee (57) ABSTRACT

The present invention is directed to an apparatus for forming a multi-layer web formed from at least two polymeric film tubes in intimate contact with each other but not bonded to each other. The apparatus and method includes the use of a blown film extrusion die that extrudes two separate blown film polymeric tubes via two separate annular die lips. A fluid cooling system applies cooling fluid across a plurality of surfaces of the two blown film tubes. One of the die lips may be at a different height from the other die lip. The frost line of one blown film tube may be at a different height from the other blown film tube.

20 Claims, 6 Drawing Sheets

(51) Int. Cl.
*B29L 7/00* (2006.01)
*B29L 9/00* (2006.01)
*B29C 48/10* (2019.01)
*B29C 48/00* (2019.01)
*B29C 48/17* (2019.01)
*B29C 48/21* (2019.01)
*B29C 48/36* (2019.01)
*B29C 48/375* (2019.01)
*B29C 48/70* (2019.01)

(56) References Cited

U.S. PATENT DOCUMENTS

| | | | |
|---|---|---|---|
| 3,853,661 A | * | 12/1974 | Sudo .................. B29C 47/0023 156/244.14 |
| 4,182,603 A | | 1/1980 | Knittel |
| 7,753,666 B2 | | 7/2010 | Wood |
| 8,586,161 B2 | | 11/2013 | Tamber |
| 9,193,107 B2 | | 11/2015 | Bertrand |
| 2014/0334749 A1 | | 11/2014 | Borchardt et al. |

* cited by examiner

APPARATUS AND METHOD FOR FORMING A POLYMERIC WEB

CROSS-REFERENCE TO RELATED APPLICATIONS

Not applicable.

BACKGROUND OF THE INVENTION

1. Field of the Invention

This invention relates generally to an apparatus and method for forming a multilayer polymeric web from two or more polymeric film tubes formed from a single blown film extrusion die. More particularly, this invention relates to an apparatus and method for forming and cooling at least pair of molten plastic film tubes exiting a pair of outlet lips of an extrusion die in a blown film process to form a continuous web comprising multiple layers of film.

2. Description of the Related Art

Thin plastic film may be produced, in addition to other manufacturing methods, by extruding plastic material, such as polyethylene resin or other similar polymeric resins, in a process known as blown film extrusion. In a typical blown film extrusion process, resin is fed into a single extruder where an extrusion screw pushes the resin through the extruder. The extrusion screw compresses the resin, heating the resin into a molten state under high pressure. The molten, pressurized resin is fed through a blown film extrusion die typically having a single annular opening or die lip. As the molten material is pushed into and through the extrusion die, a molten plastic film tube emerges from the outlet of the extrusion die. The film tube is fed into a set of nip rollers above the die which pull the tube upwards and collapses tube.

The plastic film tube is blown or expanded to a larger diameter by providing a volume of air within the interior of the tube. The combination of the volume of air and the plastic film tube is commonly referred to as a bubble between the extrusion die and a set of nip rollers. The plastic film tube is commonly cooled by one or more external air rings applying a constant flow of air upward along the outside of the plastic film tube. The ratio between the initial diameter of the tube as it exits the die and its final diameter after it expands is commonly referred to as the blow up ratio (BUR). A number of factors including, but not limited to, the air pressure within the bubble of the plastic film tube, the cooling rate provided by the air ring, the temperature and flow of material out of the extrusion die, and the rate at which the plastic film tube is pulled by the nip rollers impact the blow-up ratio, the ultimate diameter of the plastic film tube, and the ultimate thickness or gauge of the plastic film tube.

As the plastic film tube cools travelling upward toward the nip rollers, the plastic film tube solidifies from a molten state to a solid state after it expands to its final diameter and thickness. The point along the bubble where the plastic film solidifies is known as the frost line. Consequently, the portion of the bubble below the frost line is molten allowing for expansion and thinning of the plastic film tube. Conversely, the portion of the bubble above the frost line has solidified and the diameter and thickness of the plastic film tube is generally fixed at that point. Furthermore, since the film above the frost line has solidified, it tends not to adhere to itself or other films that it may come into contact with.

Improved cooling of the plastic film increases the stability of the bubble, thereby allowing for more accurate control of the physical properties of the plastic film tube, for a broader range of plastic film tube diameters and thicknesses, and improved throughput rates. To facilitate better cooling, it is known in the art to use an internal bubble cooling, or IBC, assembly to dissipate heat from within the interior of the bubble. Without an IBC assembly, the bubble contains a static volume of air applying outward pressure on the plastic film tube but there is no avenue to dissipate the heat absorbed by the static volume of air from the plastic film tube. Consequently, the interior air volume quickly settles at approximately the same temperature as the plastic film tube, providing no cooling benefit. Internal bubble cooling assemblies exchange the warm air within the bubble with cooler air while maintaining a constant pressure. The cooled air within the bubble absorbs heat from the interior surface of the bubble, cooling the plastic film tube more quickly and lowering the frost line for increased bubble stability.

U.S. Pat. No. 7,753,666 issued to Greg Wood on Jul. 13, 2010, and entitled Apparatus and Method for Cooling Plastic Film Tube in Blown Film Process (hereafter, "the Wood Patent") describes an improved internal bubble cooling assembly using particular air ring assemblies. The internal air ring assemblies improve the flow of the cooled air within the bubble to provide improved bubble stability and allow for improved properties of the plastic film tube. The teachings and specification of the Wood Patent are incorporated herein by reference.

A bubble comprising more than one layer may be formed via blown film extrusion, which is commonly referred to as coextrusion. In coextrusion, more than one discrete annular layer of film is formed within the extrusion die. Typically, each layer is provided to the die from a separate extruder. This enables different polymeric resins with different physical properties to be combined into a single bubble. In typical coextrusion, each layer is combined and placed into intimate contact with each other within the interior of the die and prior to exiting a single annular die lip. Since each layer is in a molten state when combined, the films laminate together, if the resins are compatible with each other.

Coextruded films allow for forming a singular film with multiple laminated layers with the layers bonded to each other on a molecular level. However, it is known that certain material properties of the laminate negatively influence the material properties of the laminate. For instance, the laminate typically inherits the tear strength of the layer with the weakest tear strength. Hence, when tear strength is a critical property for a web, it is undesirable to form a coextruded film with a resin having a low tear strength with another resin having a relatively strong tear strength, even though such a combination may provide other desirable properties. Thus, it would be advantageous for a blown film extrusion process that forms multiple layers of film with distinct properties with adjacent layers in contact with each other, but where the layers are not bonded to each other. With such a process, the layers of the web would maintain their own properties, such as tear strength, and the web could have multiple layers without a layer with a lower tear strength decreasing the tear strength of an adjacent layer.

U.S. Publication No. 2014/0334749 by Michael G. Borchardt "the Borchardt Application"), et. al, entitled Melt-Bonded Thermoplastic Bags with Tailored Bond Strength and Methods of Making the Same, describes forming a bubble with multiple layers with a separate die exit for each layer. The Borchardt Application describes bringing together the molten film from the two layers below at least the frost line of one of the layers such that the inner and outer layers are bonded together. However, The Borchardt Application fails to disclose allowing both bubbles to fully cool below the molten state before coming into contact with each other. Hence, the Borchardt Application requires the utilization of other measures to prevent the physical properties of one layer from degrading the physical properties of the other layer. The Borchardt Application also fails to address the decrease in throughput typical of extruding multiple layers due to the difficulties presented in adequately cooling the multiple tube of polymeric film to maintain an acceptable frost line elevation.

In view of the foregoing, it would be desirable to provide a method of forming a multilayer web from a bubble in bubble process that maintains a throughput rate more typical of high speed commercial operations. It would also be desirable for the method to provide for a multi-layer web where the layers are un-bonded to each other so that each layer maintains its own physical properties, such as tear and dart impact. The present invention addresses these needs.

SUMMARY OF THE INVENTION

The present invention is directed to an apparatus and method for forming a multi-layered polymeric web from multiple collapsed tubes of polymeric film. In one embodiment of the present invention, the apparatus includes a first source of a first molten polymer and a second source of a second molten polymer. The embodiment further includes a blown film extrusion die comprising an annular outer die lip and an annular inner die lip. The inner die lip is surrounded by the outer die lip. The first molten polymer is extruded upwardly out of the outer die lip to form an outer polymeric film tube having an outer frost line. The second molten polymer is extruded upwardly out of the inner die lip to form an inner polymeric film tube surrounded by the outer polymeric film tube. The inner polymeric film tube has an inner frost line. A height of the inner frost line is different from a height of the outer frost line. An outer bubble external cooling source directs fluid onto an exterior of the outer polymeric film tube. Furthermore, an inner bubble interior cooling source directs cooling fluid onto an interior of the inner polymeric film tube.

In some embodiments of the present invention, an elevation of the outer die lip may be different from an elevation of the inner die lip. The outer die lip may be at a lower elevation than the inner die lip. The height of the outer frost line may be lower than the height of the inner frost line. An intermediate cooling source may direct cooling fluid onto an interior of the outer polymeric film tube and an exterior of the inner polymeric film tube. An intermediate exhaust may exhaust cooling fluid from an interior of the outer polymeric film tube and an exterior of the inner polymeric film tube. An interior inner bubble exhaust may exhaust cooling fluid from the interior of the inner polymeric tube.

In further embodiments of the present invention, a set of nip rollers may be located above the inner and outer frost lines. The set of nip rollers can simultaneously collapse the inner and outer polymeric film tubes. Furthermore, a characteristic of the first molten polymer may be different from a characteristic of the second molten polymer. The characteristic of the first molten polymer differing from the characteristic of the second molten polymer may be due to a coloring agent added to one of the first and second molten polymers.

In a further embodiment of the present invention, a multi-layered polymeric film tube is formed by a process. In the process a first source of a first molten polymer and a second source of a second molten polymer are provided. A characteristic of the first molten polymer may differ from a characteristic of the second molten polymer. The first molten polymer is extruded from an outer die lip of an extrusion die such that an outer polymeric film tube is formed with an outer frost line. The second molten polymer is extruded from an inner die lip of the extrusion die such that an inner polymeric film tube is formed with an inner frost line. The inner die lip is surrounded by the outer die lip and the inner frost line is at a different height than the outer frost line. Cooling fluid is directed onto an exterior of the outer polymeric film tube by an outer bubble external cooling source. Cooling fluid is also directed onto an interior of the inner polymeric film tube by an inner bubble interior cooling source. The outer and inner polymeric tubes are collapsed so that the tubes are placed into intimate contact with each other without bonding to each other.

In certain embodiments of the present invention, cooling fluid from a single cooling fluid supply may be directed onto an interior of the outer polymeric film tube and an exterior of the inner polymeric film tube. Additionally, the first molten polymer may comprise a different color than the second molten polymer.

In a further embodiment of the present invention, an apparatus forms a multi-layered web from multiple tubes of polymeric film. The apparatus includes a first extruder that extrudes a first molten polymeric stream. The apparatus further includes a flow splitter that splits the first molten polymeric stream into a second polymeric stream and a third polymeric stream. Additionally, a static mixer mixes at least one additive to the second polymeric stream. A first die path supplies the second polymeric stream to a first die lip and a second die path supplies the third polymeric stream to a second die lip. The first die lip extrudes a first polymeric tube from the second polymeric stream and the second die lip extrudes a second polymeric tube from the third polymeric stream. The second die lip is located within the first die lip. A set of nip rollers collapses the first and second polymeric tubes and places the tubes in intimate contact with each other without the two tubes being bonded together.

In particular embodiments of the present invention, the first die lip may be at a lower height than the second die lip. Furthermore, the first polymeric tube may have a first frost line and the second polymeric tube may have a second frost line. Additionally, the first frost line may be lower than the second frost line. An interior of the first polymeric tube and an exterior of the second polymeric tube may be both cooled by a cooling fluid supplied by a single cooling source. The second polymeric tube may further comprise a high stalk.

BRIEF DESCRIPTION OF THE RELATED DRAWINGS

A full and complete understanding of the present invention may be obtained by reference to the detailed description of the present invention and described embodiments when viewed with reference to the accompanying drawings. The drawings can be briefly described as follows.

FIG. 3b provides a detailed cross-sectional perspective view of a lower portion of the embodiment shown in FIG.

2 with directional arrows showing various flow directions of cooling fluid. The directional arrows form no part of the invention and are shown for reference only.

DETAILED DESCRIPTION OF THE INVENTION

The present disclosure illustrates one or more embodiments of the present invention. It is not intended to provide an illustration or encompass all embodiments contemplated by the present invention. In view of the disclosure of the present invention contained herein, a person having ordinary skill in the art will recognize that innumerable modifications and insubstantial changes may be incorporated or otherwise included within the present invention without diverging from the spirit of the invention. Therefore, it is understood that the present invention is not limited to those embodiments disclosed herein. The appended claims are intended to more fully and accurately encompass the invention to the fullest extent possible, but it is fully appreciated that certain limitations on the use of particular terms is not intended to conclusively limit the scope of protection.

Figure 1:
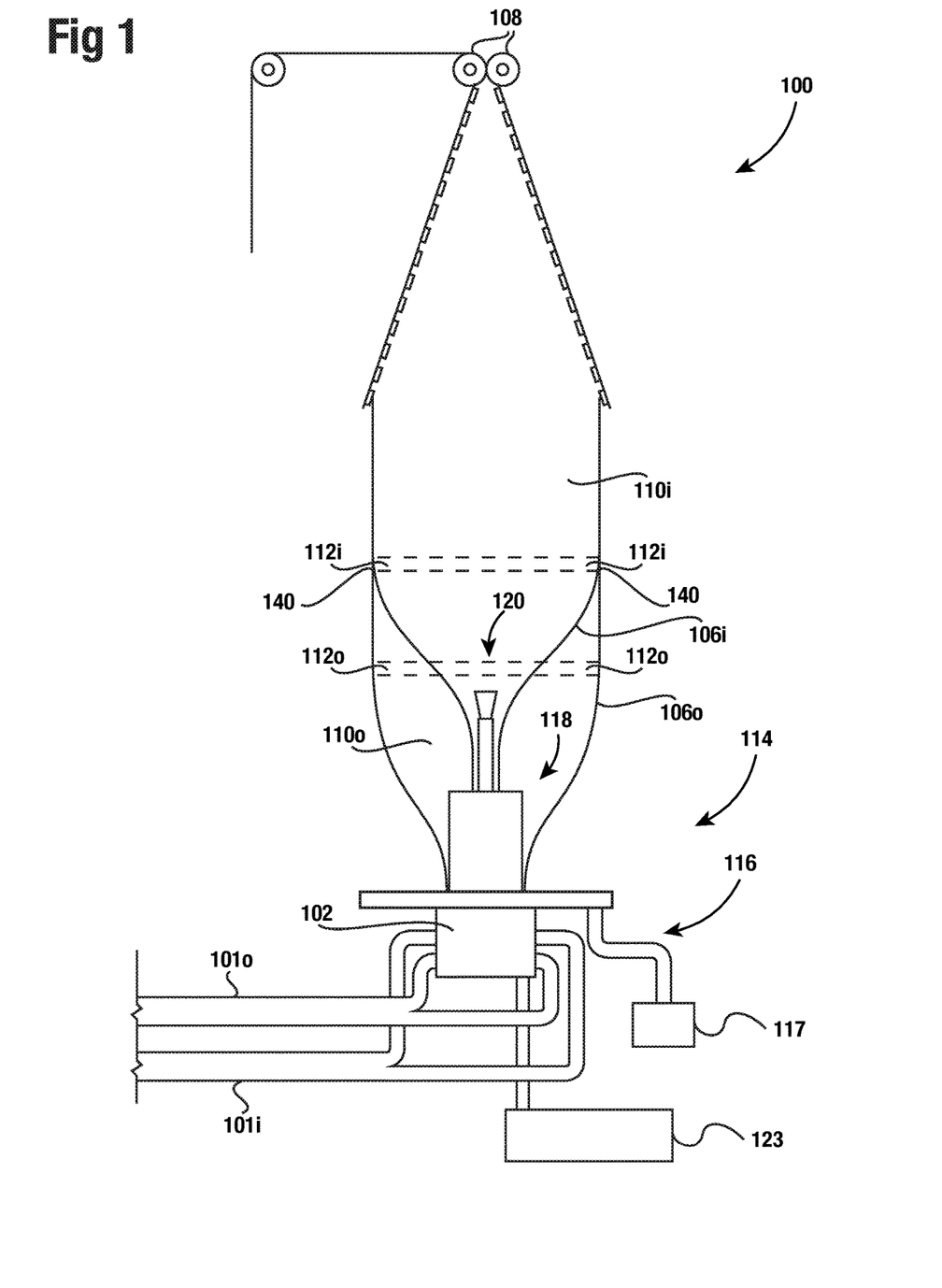
FIG. 1 provides a schematic elevation view of a bubble-in-a-bubble blown film extrusion process according to one embodiment of the present invention.

FIG. 1 illustrates a schematic overview of a blown film extrusion system 100, according to one embodiment of the present invention, for producing plastic film utilizing a blown film extrusion process. Polyethylene resin, in the form of pellets, is fed into one or more extruders (not shown). The pellets are heated in the one or more extruders until the polyethylene resin is molten. The one or more extruders supply two independent sources of molten polymer, a first polymer source 101o, and a second polymer source 101i. The molten material is fed under pressure through an extrusion die 102 having two independent annular openings. Each annular opening of the die may be referred to as a die lip.

As further shown in FIG. 1, extrusion die 102 can then extrude two molten plastic film tubes, outer tube 106o, and inner tube 106i formed by the two annular die lips. The two tubes then form two blown film polymeric bubbles, outer bubble 110o, and inner bubble 110i. Also shown in FIG. 1 are two frost line regions, outer frost line region 112o, and inner frost line region 112i, where the two corresponding bubbles transition from a molten polymeric film to a solid material. The location at which the outer and inner tubes 106o and 106i expand to come into contact with each other is shown as the bubble-to-bubble contact point 140 in FIG. 1. For ease of reference throughout this disclosure the character "o" is used in reference to the outer bubble and related features while the character "i" is used in reference to the inner bubble and related features within the accompanied drawings.

Nip rollers 108 are also shown in FIG. 1 at the top of bubbles 110o and 110i. Nip rollers 108 pull tubes 106o and 106i up and away from die 102. Tubes 106o and 106i are also simultaneously collapsed by nip rollers 108 as each tubes passes through nip rollers 108. Since nip rollers 108 flatten both tubes 106o and 106i, the nip rollers 108 form an enclosed volume for each tube, the outer bubble 110o and inner bubble 110i, which correspond to the outer and inner tubes 106o and 106i.

Internal fluid pressure within each bubble 110o and 110i applies outward pressure on each plastic film tube 106o and 106i, leading to the diameter of each bubble 110o and 110i expanding. As each plastic film tube 106o and 106i rises, it cools, solidifying from a molten state to a solid state as it expands to its final diameter and thickness. As used throughout this disclosure, the term tube typically refers to the tubular shaped film extruded from each die lip and the term bubble typically refers to the tubular structure of film and the volume encased by the tubular structure between the corresponding die lip and nip rollers. However, the terms tube and bubble may be used interchangeably throughout the disclosure due to the close inter-relationship between the two terms in the blown film extrusion process.

As further shown in FIG. 1, a cooling system 114 can be provided to cool the two bubbles as they form to maintain a commercially reasonable throughput rate. The cooling system 114 decreases the time required for the molten polymer to cool to a solid film. As shown in FIG. 1, an outer bubble external cooling source 116, an intermediate cooling source 118, and an inner bubble interior cooling source 120 can be included with cooling system 114. Outer cooling fluid source 117 can supply cooling fluid to the outer bubble external cooling source 116 while inner cooling fluid supply 123 can supply cooling fluid to intermediate cooling source 118 and inner bubble interior cooling source 120. In an alternative embodiment, each cooling source can have separate cooling supplies or a single cooling supply may supply each cooling source.

Figure 2:
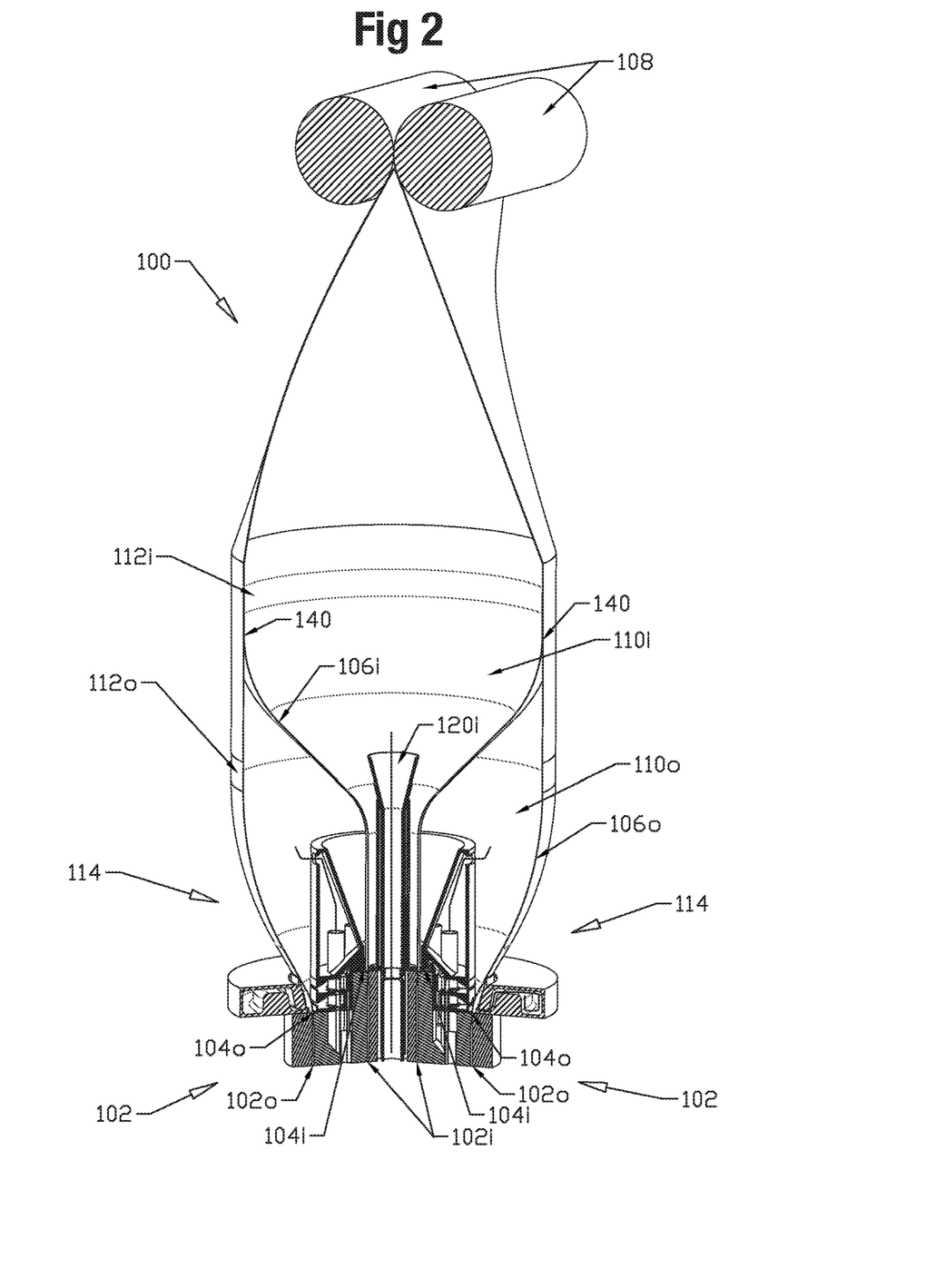
FIG. 2 provides a cross-sectional perspective view of an embodiment of the invention shown schematically in FIG. 1.
Figure 3A:
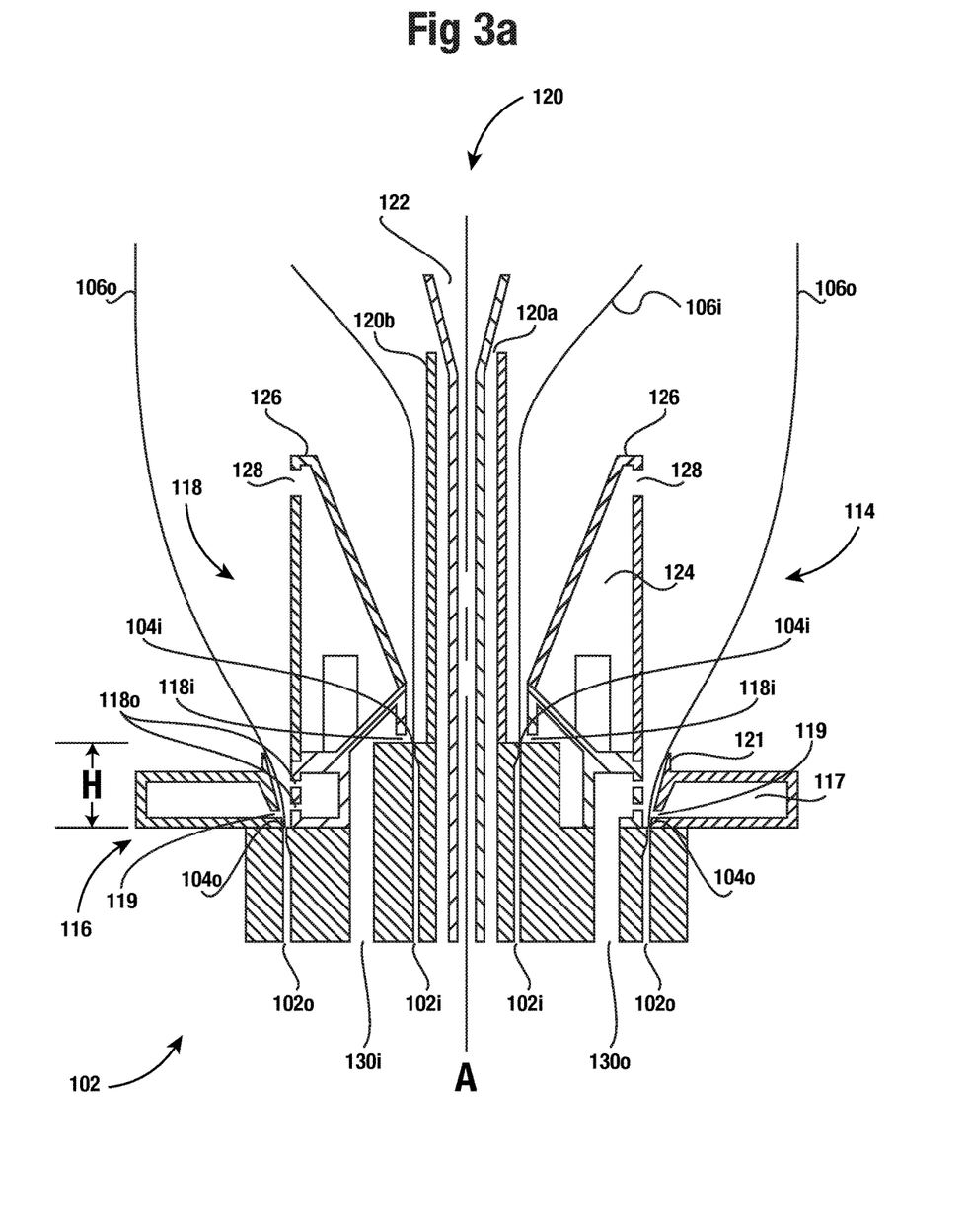
FIG. 3a provides a simplified cross-section, for the sake of clarity, of the embodiment of the invention shown in FIG. 2.
Figure 3B:
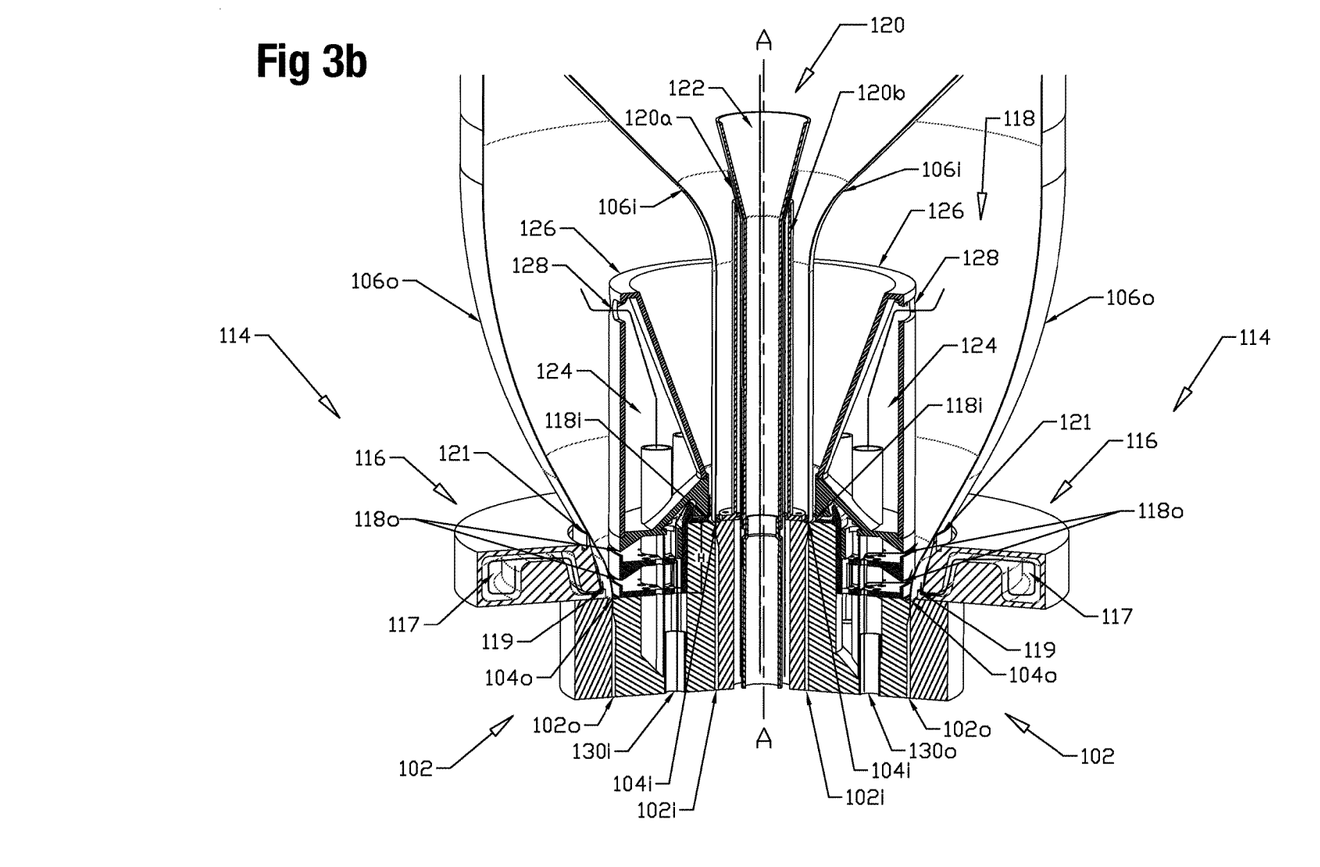
Figure 4:
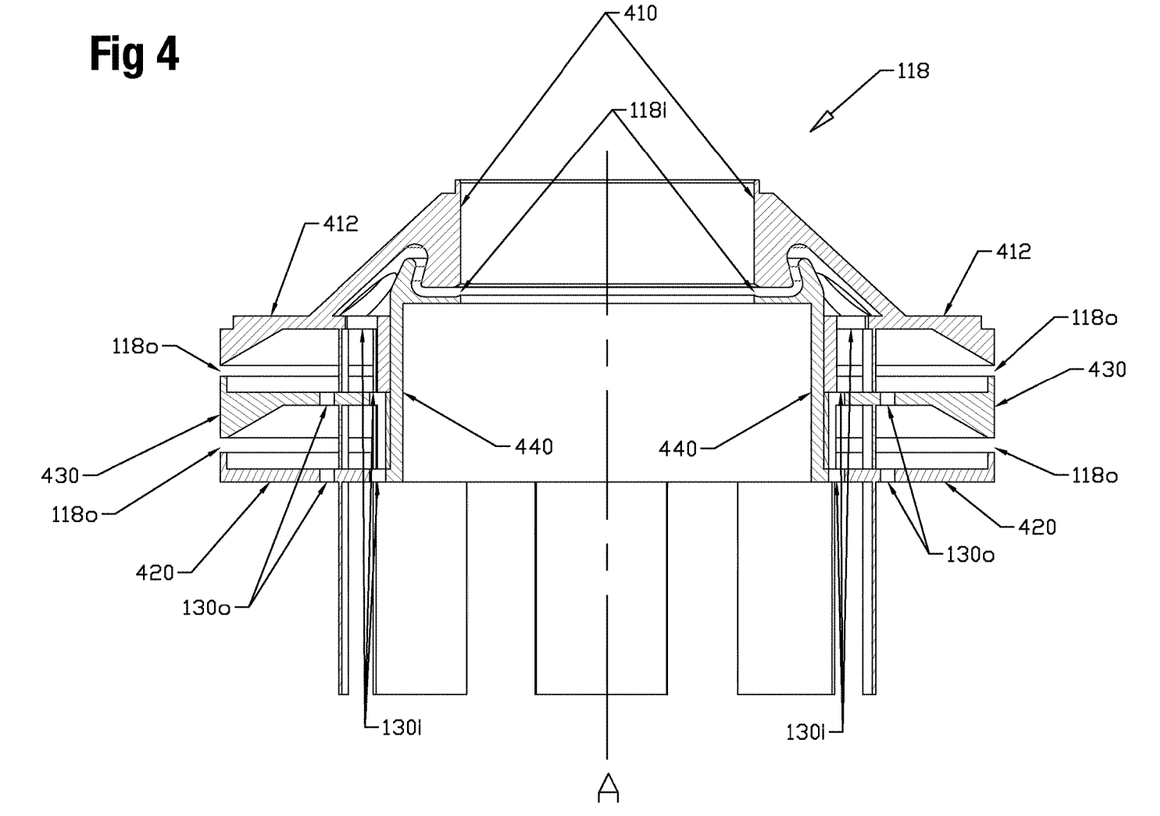
FIG. 4 provides a cross-sectional elevation view of an intermediate cooling source of the embodiment shown in FIGS. 2 and 3.

Shown in FIG. 2 is a detailed cross-sectional view of an embodiment of the blown film extrusion system shown schematically in FIG. 1. In general, the majority of features of blown film extrusion system 100 are symmetric about common axis A as shown in FIGS. 3a, 3b, and 4, which extrusion die 102 and cooling system 114 are centered about.

Shown in FIG. 2 is extrusion die 102. Extrusion die 102 has two separate annular die paths 102o and 102i. Molten polymeric resin is fed to die paths 102o and 102i. As better shown by FIG. 3a, each die path leads to a separate annular die lip with die path 102o delivering molten polymer to outer die lip 104o and die path 102i delivering molten polymer to inner die lip 104i. From a horizontal perspective, inner die lip 104i is encircled or encompassed by outer die lip 104o; and from a vertical perspective, inner die lip 104i is elevated above outer die lip 104o.

As the molten material is extruded from each die lip 104o and 104i, separate molten plastic film tubes 106o and 106i emerge. Outer die lip 104o extrudes outer plastic or polymer film tube 106o and inner die lip 104i extrudes inner polymeric film tube 106i. Since inner die lip 104i is within outer die lip 104o, inner tube 106i is located within outer tube 106o.

In at least one embodiment, one or both of film tubes 106o and 106i may comprise multiple discrete layers of polymeric resin formed by a coextrusion process as known in the art where multiple layers are combined in the die prior to exiting from the die. Since the layers are extruded together in a molten state, the layers are bonded to adjacent layers, presuming that adjacent layers comprise compatible resins.

The height or location at which each tube transitions from a molten polymer to a solid polymer is typically referred to as a frost line. Since the polymer is solidified once above the frost line, the film typically fails to expand any further above the frost line. The frost line for a given blown film extrusion process can vary depending upon process conditions. Hence, the relative desired range of the frost line contemplated by the invention is shown by frost line regions 112o and 112i in FIGS. 1 and 2.

Outer frost line region 112o corresponds to outer tube 106o and outer bubble 110o. Inner frost line region 112i corresponds to inner tube 106i and inner bubble 110i. The lower portion of each plastic film tube below frost line regions 112o and 112i is generally molten while the upper portion of each plastic film tube above each corresponding frost line region is generally solid. The inner frost line region 112i is shown at a relatively lower height in FIG. 1 in comparison to the location of inner frost line region shown in FIG. 2.

The invention contemplates that outer tube 106o transitions from a molten polymer to a solid polymer at a different height than inner tube 106i and prior to coming into contact with inner tube 106i. Hence, as shown in FIGS. 1 and 2, the outer frost line region 112o is located at a lower elevation or height than the inner frost line region 112i. As further shown by FIGS. 1 and 2, outer tube 106o transitions into a solid polymer prior to coming into contact with inner tube 106i. Inner tube 106i continues to expand until reaching its frost line within inner frost line region 112i and coming into contact with outer tube 106o at contact point 140.

The frost line of inner tube 106i is ideally controlled so that frost line of inner tube 106i is at or just below the contact point 140 as shown by FIG. 1. Since the frost line of the inner tube may vary slightly, it is contemplated that the inner tube frost line may be slightly above the bubble-to-bubble or tube-to-tube contact point 140 as shown by FIG. 2. However, it is understood in the art that a blown film polymeric bubble gradually transitions from a molten state to a solid state.

As the film of a blown film bubble approaches closer to the frost line, the film gradually transitions from a molten to a solid state. Hence, the invention contemplates that even if the contact point 140 is reached prior to the inner bubble becoming fully solidified as shown in FIG. 2, the film of the inner tube will not bond with the film of the outer tube since contact point 140 is substantially adjacent to frost line region 112i and inner tube 106i has transitioned substantially from a molten to a solid prior to reaching contact point 140.

In at least one embodiment of the invention, inner tube 106i may not expand to the same or a substantially similar diameter for the inner tube 106i to come into contact with the outer tube 106o when expanded. However, the two tubes will still come into contact with each when they pass through nip rollers 108 and are collapsed on to each other. Such an arrangement ensures that inner tube 106i has fully transitioned to solid film prior to coming into contact with outer tube 106o. Once passing through the nip rollers 108, the film of the two tubes will be placed in intimate contact with each other, but the outer edges of flattened inner tube 106i will be slightly recessed from the outer edges of flattened outer tube 106o.

Depending upon the resin composition of the inner and outer tubes and process conditions, the two films may experience a certain amount of blocking, but the invention contemplates that the two adjacent films do not bond to each other. Whether the films of the inner and outer tubes bond to each other is partly dependent upon the material of the two films and, in particular, each film's crystallinity. Thus, the invention contemplates that in one preferred embodiment, use of a linear low-density polyethylene (LLDPE) or low-density polyethylene (LDPE) polymer for the outer tube 106o and a high-density polyethylene (HDPE) polymer for the inner tube 106i may be used to assist in preventing the film of the two tubes from bonding to each other.

Other polymers, such as nylon or polypropylene, may be used in conjunction with each other or with polyethylene polymers, which may also provide for non-adherence between the individual tubes. In conjunction with incompatible polymers or standing alone, one or more additives may be used to prevent the film of the tubes from adhering to each other. For instance, calcium carbonate ($CaCO_3$) may be added to the polymer of one or both tubes during the extrusion process to assist in preventing the film of the two tubes from adhering to each other. Use of $CaCO_3$ may also be used in one of the tubes or to a greater extent in the polymer of one of the tubes, such as the outer tube, to lower the frost line of the tube since $CaCO_3$ increases the cooling rate for a given molten polymer.

Rather than varying the composition of individual tubes to prevent bonding between adjacent surfaces of the outer and inner tubes 106o and 106i, materials may be injected between the bubbles of the two tubes to prevent bonding of the adjacent surfaces. For instance, a vaporized or atomized liquid may be injected between the two bubbles 110o and 110i of the outer and inner tubes 106o and 106i during the blown film extrusion process. Such a liquid can be utilized to accelerate the cooling of the adjacent surfaces of the outer and inner bubbles 110o and 110i by lowering each surface's temperature. Furthermore, the injected liquid could include a volatile scented compound to add a pleasing scent to the final product. Adding a scented compound in between the layers may be an alternative to adding a scented compound to the molten polymers as is commonly known in the art for forming scent polymeric bags. The liquid could also include anti-blocking agents to prevent the layers from adhering or blocking with each other.

Rather than a liquid, dry materials such as a finely granulated or powder-like substance may be injected between the two bubbles. Such a dry material may be injected between the layers with the use of the cooling fluid of the intermediate cooling source as a carrier of the powder-like substance. The powder-like substance may have anti-blocking or scented properties as discussed above regarding an injected liquid material.

The rate at which the film of the outer and inner tubes 106o and 106i cool and hence the height of their frost lines may be controlled by additional methods. For instance, the film of the outer tube 106o may be formed thinner than the film of the inner tube 106i; and hence encourage cooling of outer tube 106o at a faster rate since less material per a given length will require cooling. Furthermore, the amount of cooling fluid delivered to the outer tube 106o may be greater than the amount of cooling fluid delivered to the inner tube 106i. A greater amount of cooling fluid delivered to the outer tube 106o than to inner tube 106i will encourage cooling of the outer tube at a faster rate and hence assist in moving its frost line lower in relation to the frost line of the inner tube 106i. The temperature of the cooling fluid deliverer to the outer tube 106o can also be lower, or its cooling capacity increased, to also encourage faster cooling of the outer bubble 106o.

Controlling the final diameter and film thickness of each plastic film tube 106o and 106i are, among other factors, the air pressure within the interior of each plastic film tube or bubble, the cooling rate provided by cooling system 114, the speed of the nip rollers 108, and the amount of resin pushed through each extrusion die lip 102o and 102i by the one or more extruders. Most importantly in the present invention, embodiments of cooling system 114 are disclosed to facilitate the forming of outer tube 106o and inner tube 106i within desired dimensions, process conditions, and at commercially reasonable throughput rates.

As shown in FIG. 2 and more clearly in FIGS. 3a and 3b, cooling system 114 provides cooling fluid to at least a lower area of an external surface of outer tube 106o and in internal surface of inner tube 106i. The cooling fluid may comprise ambient air, chilled ambient air, a cryogenic fluid mixture such as liquid nitrogen used to cool ambient or chilled air, or air chilled additionally by an evaporative liquid injected into the cooling fluid. Cooling system 114 may also provide for the exhausting of the inputted cooling fluid from any enclosed volume of the extrusion system, such as the interior of inner bubble 110i and the enclosed volume between the outer and inner bubbles 110o and 110i.

As previously mentioned, FIGS. 3a and 3b illustrate an enlarged partial view of the embodiment of the present invention shown in FIG. 2. As shown in the depicted embodiment, the cooling system 114 can provide both external and internal cooling for both the outer and inner tubes 106o and 160i. Cooling system 114 can include an outer bubble external cooling source 116, intermediate cooling source 118, and inner bubble interior cooling source 120.

Shown furthest from the center of the polymeric tubes in FIGS. 3a and 3b is an outer bubble external fluid source 116 directing cooling fluid on to an external side of the outer tube 106o. Outer bubble external cooling source 116 may comprise an air ring with a cooling fluid supply 117 and supply outlet 119. Further incorporated into the outer bubble external cooling source 116 may be an air ring lip 121 to assist in controlling the cooling fluid exiting supply outlet 119 and the expansion of outer bubble 110o.

As further shown in FIGS. 3a and 3b, with certain aspects shown more clearly in FIG. 4, an intermediate bubble cooling source 118 can be located inside the outer bubble 106o and outside the inner bubble 106i. Intermediate bubble cooling source 118 may include an outer outlet 118o and inner outlet 118i. Intermediate cooling source 118 may be in the general form of an air ring. The cooling source 118 may be centered about the vertical axis A, as shown in FIGS. 3a, 3b and 4. The cooling source 118, in general, may have an annular shape with opposing annular shaped horizontal walls 412 and 420 extending away from the vertical axis A, as shown in FIG. 4. The cooling source 118 may further have opposing inner and outer annular shaped vertical walls 440 and 430 extending parallel and offset from the vertical axis A and following inner and an outer circumferences of cooling source 118.

As shown best by FIG. 4, intermediate cooling source 118 may have a staggered, a stair-step, or vertically offset construction to accommodate the different elevations of outer and inner die lips 104o and 104i, as shown in FIGS. 3a and 3b. This vertically offset construction leads to an additional annular shaped upper inner vertical wall 410 with a smaller diameter than a diameter of annular shaped lower inner vertical wall 440, with upper inner vertical wall 410 above lower inner vertical wall 440. This vertically offset construction allows for intermediate air supply 118 to supply cooling fluid to the interior surface of outer bubble 110o and the exterior surface of inner bubble 110i of FIGS. 1 and 2, while efficiently utilizing the available space provided by the offset height or elevation difference of outer and inner die lips 104o and 104i as shown by FIGS. 1-3.

Returning to FIGS. 3a and 3b, outer and inner supply outlets 118o and 118i are shown supplied by separate fluid supplies 130o and 130i. In an alternative embodiment, both outer and inner outlets 118o and 118i may be supplied by a common fluid supply. Further shown in FIG. 3b are one or more baffles that can control the amount of cooling fluid supplied to outer outlet 118o and inner outlet 118i.

As also shown in FIGS. 3a and 3b, the outer outlet 118o may direct fluid on to the interior surface of the outer tube 106o and the inner outlet 118i may direct fluid on to the exterior surface of the inner tube 106i. The outer outlet 118o may direct fluid on to the interior surface of the outer tube 106o due to it being defined along the outer circumference of the cooling source 118 along the outer vertical wall 430.

As shown in FIGS. 3a, 3b and 4, the inner outlet 118i of intermediate cooling source 118 may direct cooling fluid on to the external surface of the inner bubble 106i due to the inner outlet 118i being defined below upper inner vertical wall 410 of cooling source 118. The upper inner vertical wall 410 may have defined in it inner outlet 118i with a generally annular opening so that the exit of fluid from the cooling source 118 through inner outlet 118i is at least partly controlled by a gap between the outer circumference of the stalk of the inner tube 106i and the inner diameter of the cooling source 118. As shown in FIGS. 3a and 3b, cooling fluid exiting outlet 118i may impede directly upon a lower bottom exterior surface of inner bubble 106i immediately above inner die lip 104i.

Further shown in FIGS. 3a and 3b, between the outer and inner bubbles 106o and 106i is a common exhaust 124. Common exhaust 124 exhausts the cooling fluid supplied by the outer and inner outlets 118o and 118i of the intermediate cooling fluid supply 118. Common exhaust 124 may be comprised of a plurality of vertical tubes dispersed circumferentially about vertical axis A of FIGS. 3a and 3b. Each opening of the plurality of tubes may be elevated above the outlets of the intermediate cooling fluid supply so that the cooling fluid flows about the surfaces of the inner and outer bubbles prior to returning through common exhaust 124.

Prior to the cooling fluid entering common exhaust 124, the cooling fluid may pass through an exhaust shroud 126 covering the common exhaust 124 as shown in FIGS. 3a and 3b. The exhaust shroud 126 may have a generally annular shape, be placed above common exhaust 124, and have a generally continuous annular slit 128 on an external wall of the exhaust shroud to evenly distribute the partial vacuum and evacuation of fluid from the volume between the outer and inner bubbles 110o and 110i.

In an alternative embodiment to the blown film extrusions system shown in FIGS. 1-3, the intermediate cooling source may not be provided in what otherwise is a similar blown film extrusion system for forming a multi-layered polymeric web of film. Rather than an intermediate cooling source that exchanges cooling fluid in the volume defined between the outer and inner bubbles 110o and 110i, a static volume of air or other gaseous fluid, such as nitrogen, may be utilized to fill the enclosed volume between the two bubbles. A static volume of fluid can provide the necessary pressure to maintain the desired gap between the outer and inner bubbles 110o and 110i. However, since the volume of fluid is static, the ability for the system to cool the two bubbles decreases dramatically. Hence, the throughput, or processing speed may increase significantly compared to the process disclosed by FIGS. 1-3 utilizing the above discussed intermediate cooling source 114.

Further shown in FIGS. 3a and 3b is an inner bubble interior cooling source 120 which provides internal bubble cooling (IBC) to the interior surface of the inner bubble 106i. With the use of a high-stalk inner bubble, the outlet 120a of the inner bubble interior cooling source 120 may be located above the stalk of the inner bubble, as shown in FIGS. 3a and 3b. The outlet may be a simple annular shaped opening at the end of a riser 120b of the inner bubble interior cooling source located within the stalk of the inner bubble. The riser 120b may be formed from an outer cylindrical wall and an inner cylindrical wall with cooling fluid supplied between the two cylinders.

Further shown in FIGS. 3a and 3b may be provided an inner bubble exhaust 122. The exhaust 122 may be provided to exhaust the cooling fluid supplied to the interior of the inner bubble by the inner bubble cooling source 120. In at least one embodiment, the exhaust 122 may be located within the inner bubble cooling source 120. An inlet of the exhaust may be in the shape of an inverted cone located above the cooling source 120. The inverted cone directs the cooling fluid supply towards the interior surface of the inner bubble and helps to accumulate the fluid supply into exhaust 122.

As further shown in FIG. 2 and in greater detail in FIGS. 3a and 3b, inner die lip 104i may be at a higher elevation than outer die lip 104o. In one particular embodiment, inner die lip 104i may have a diameter of approximately seven inches and outer die lip 104o may have a diameter of approximately eighteen inches. Furthermore, in the same embodiment, inner die lip 104i may have an elevation approximately four inches higher than outer die lip 104o. The difference in height or elevation between the two die lips is shown as H in FIG. 3a. The differences in die lip elevations provides additional space between inner tube 106i and outer tube 106o for locating an intermediate bubble cooling source 118 as shown in FIGS. 2 and 3. In at least one alternative embodiment (not shown), both die lips of the die may be at the same elevation.

As further illustrated in FIGS. 3a and 3b, additional space may also be provided for intermediate cooling source 118 by utilizing a high-stalk bubble for inner bubble 110i. However, a traditional lower stalk bubble may also be used as contemplated by the invention. A high-stalk bubble refers to a bubble where the diameter of the extruded plastic film tube remains relatively constant with the die lip diameter for a considerable distance after exiting the die lip. In one particular embodiment, as shown in FIGS. 3a and 3b, the inner die lip 104i diameter may be approximately seven inches and the stalk height of inner film tube 106i may be approximately 42-70 inches prior to the inner tube 106i beginning to expand into its final diameter after reaching the frost line within frost line region 112i. The final diameter of inner film tube 106i, which in certain embodiments may be shared with outer film tube 106o, may be approximately 38 inches.

In at least one embodiment, the formation of inner film tube 106i with a high-stalk bubble may be aided with the use of a high molecular weight (HMW) polymeric resin. Furthermore, due to the relative small initial diameter of the inner film tube 106i, the blow up ratio (BUR) of the tube may be considerably larger, as shown in FIGS. 1-2, than the BUR of outer film tube 106o. The BUR defines the ratio between the initial diameter of a blown film tube after exiting the die to its final diameter at its frost line. In the above discussed example, the BUR of the inner film tube is approximately 5.4:1 while the BUR of the outer film tube is approximately 2:1. A ratio between the BUR of the outer and inner film tubes may also be calculated, with the above discussed ratio of the BUR calculated to be approximately 2.6:1.

Figure 5:
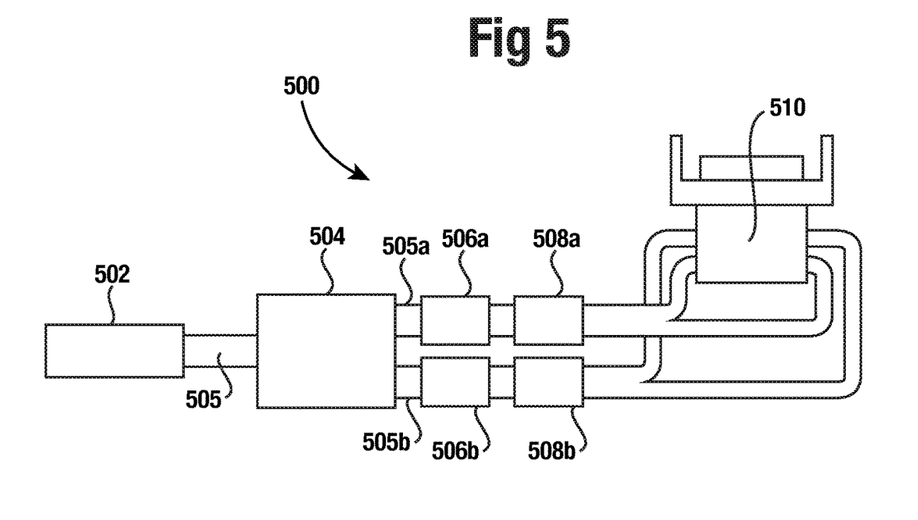
FIG. 5 provides a schematic elevation view of single extruder process according to an embodiment of the present invention.
Figure 6:
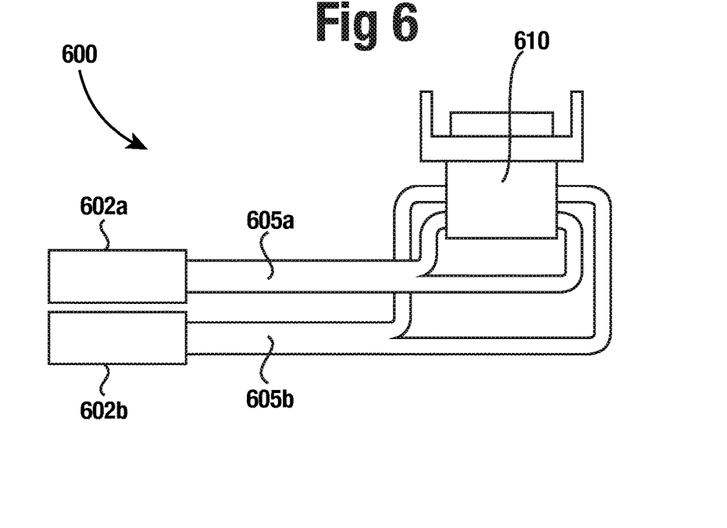
FIG. 6 provides a schematic elevation view of a dual extruder process according to an embodiment of the present invention.

Now turning to FIGS. 5 and 6, two alternative embodiments for providing two distinct molten polymer sources to die 102 are illustrated. Each of the embodiments provides a means for delivering two polymer streams with distinctive characteristics from the other to each die path 102o and 102i.

One alternative is illustrated by FIG. 5. FIG. 5 shows blown film extrusion system 500 with molten polymer extruded by a single extruder 502 and exiting the extruder 502 as a single first polymer stream 505. The first polymer stream 505 is shown flowing into a splitter or flow divider 504 that splits the first polymer stream 505 into two separate streams: a second polymer stream 505a and a third stream polymer 505b. First polymer stream 505 may be divided equally into the second and third polymer streams 505a and 505b or divider 504 may also be configured to apportion other various amounts of polymer between the two downward streams 505a and 505b.

Once divided into two separate streams, each polymer stream 505a and 505b is shown passing through a corresponding gear pump 506a or 506b, or similar pump device, to increase each polymer stream's pressure. Once each polymer stream exits one of the gear pumps, it is shown passing through a corresponding static mixer, a first static mixer 508a or second static mixer 508b.

Prior to entering each gear pump or static mixer, one or more additives or resin modifiers may be added to each polymer stream. The one or more additives may consist of a colorant, another resin modifier such as a slip agent, or a combination of additives. The addition of the one or more additives may be used to modify a characteristic of one of the polymer streams 505a and 505b such that one polymer stream has at least one characteristic different from the other polymer stream. Since the disclosure, in at least a preferred embodiment, contemplates the use of a gear pump and static mixer, the one or more additives or resin modifiers would preferably be in the form of a liquid supplied by a liquid pump. In an alternative embodiment, a dedicated extruder may be used to supply modifiers in solid form to the extruder and then supplied to the resin stream at the same location in molten form.

When each polymer stream 505a and 505b pass through a corresponding static mixer, the one or more additives are distributed throughout each flow of molten polymer. Once the two separate polymer streams 505a and 505b pass through a corresponding static mixer, the separate polymer streams are shown in FIG. 5 flowing into a separate die path of die 510. The separate dies paths can be the die paths 102o and 102i as shown by previously discussed FIGS. 1 and 2. Each polymer stream may then form a separate polymeric tube, such as outer and inner tubes 106o and 106i of FIGS. 1-3 after being extruded out of respective die lips 104o and 104i.

Rather than the flow being split from a single extruder as discussed above in regards to FIG. 5, separate extruders may be provided to supply the molten polymer to each die lip of a multiple lip die, as shown by FIG. 6. Blown film extrusion system 600 comprises two separate extruders 602a and 602b. In system 600, additives, modifiers, and even the selection of polymeric resins may be varied between first and second extruders 602a and 602b. Each extruder may supply a completely different polymeric resin with distinct additives, or any variation thereof to separate independent die lips.

As shown by FIG. 6, once molten polymer exits extruders 602a and 602b, two separate polymer streams are formed, a first polymer stream 605a and a second polymer stream 605b. Polymer stream 605a is shown entering a first die path defined in die 610 and polymer stream 605b is shown entering a second die path of die 610. Each polymer stream 605a and 605b may then form a separate polymeric tube, such as outer and inner tubes 106o and 106i of FIGS. 1-3.

Dual extruder blown film extrusion system 600 provides a simpler system with greater flexibility in material selection in comparison to single extruder extrusion system 500. However, single extruder extrusion system 500 provides a more efficient system in comparison to system 500 since only one extruder is required. Hence, system 500 allows more efficient transition from a typical mono-extrusion blown film process to a bubble-in-bubble extrusion system as contemplated by the disclosed invention. System 500 also allows for formation of a multilayer web from a bubble-in-bubble process with each web or flattened tube having differing properties, such as each layer comprising a different color when at least one colorant agent is added to one of the independent polymer streams 505a and 505b.

As previously noted, the specific embodiments depicted herein are not intended to limit the scope of the present invention. Indeed, it is contemplated that any number of different embodiments may be utilized without diverging from the spirit of the invention. Therefore, the appended claims are intended to more fully encompass the full scope of the present invention.

We claim:

1. A process for forming a multi-layered polymeric film tube comprising:
    providing a first source of a first molten polymer,
    providing a second source of a second molten polymer, wherein a characteristic of the first molten polymer differs from a characteristic of the second molten polymer,
    extruding the first molten polymer from an outer die lip of an extrusion die, wherein an outer polymeric film tube is formed, the outer polymeric film tube having an outer frost line,
    extruding the second molten polymer from an inner die lip of the extrusion die, wherein an inner polymeric film tube is formed, the inner polymeric film tube having an inner frost line,
        wherein the inner die lip is surrounded by the outer die lip and the inner frost line is at a different height than the outer frost line,
    directing cooling fluid onto an exterior of the outer polymeric film tube by an outer bubble external cooling source,
    directing cooling fluid onto an interior of the inner polymeric film tube by an inner bubble interior cooling source,
    exhausting cooling fluid from the interior of the inner polymeric film tube by an inner bubble interior exhaust,
    directing from a single cooling fluid supply cooling fluid onto an interior of the outer polymeric film tube and an exterior of the inner polymeric film tube by an intermediate cooling source, and
    collapsing the outer and inner polymeric tubes so that the tubes are placed into intimate contact with each other.

2. The process of claim 1 further comprising:
    the inner die lip at a higher elevation than the outer die lip.

3. The process of claim 1 further comprising:
    the height of the outer frost line lower than the height of the inner frost line.

4. The process of claim 1 further comprising:
    exhausting cooling fluid from the interior of the outer polymeric film tube and the exterior of the inner polymeric film tube by an intermediate exhaust.

5. The process of claim 1 further comprising:
    the first molten polymer comprising a different color than the second molten polymer.

6. A process for forming a multi-layered polymeric film tube comprising:
    extruding a first molten polymeric stream by a first extruder,
    splitting the first molten polymeric stream into a second polymeric stream and a third polymeric stream by a flow splitter,
    mixing at least one additive to the second polymeric stream by a static mixer,
    supplying the second polymeric stream to a first die lip by a first die path,
    supplying the third polymeric stream to a second die lip by a second die path,
    extruding a first polymeric tube supplied by the first die path by a first die lip,
    extruding a second polymeric tube supplied by the second die path by a second die lip, the second die lip located within the first die lip, and
    collapsing the first and second polymeric tubes and placing the tubes in intimate contact with each other by a set of nip rollers.

7. The process of claim 6 further comprising:
    the first die lip at a lower height than the second die lip.

8. The process of claim 6 further comprising:
    the first polymeric tube having a first frost line and the second polymeric tube having a second frost line, and the first frost line lower than the second frost line.

9. The process of claim 6 further comprising:
    directing cooling fluid onto an interior of the first polymeric tube and an exterior of the second polymeric tube.

10. The process of claim 9 further comprising:
    the cooling fluid directed onto the interior of the first polymeric tube and the exterior of the second polymeric tube supplied by a single cooling source.

11. The process of claim 9 further comprising:
    exhausting cooling fluid from the interior of the first polymeric tube and the exterior of the second polymeric tube by an intermediate exhaust.

12. The process of claim 6 further comprising:
    the second polymeric stream comprising a different color than the third polymeric stream.

13. The process of claim 6 further comprising:
    directing cooling fluid onto an interior of the second polymeric tube by an inner bubble interior cooling source, and
    exhausting cooling fluid from the interior of the second polymeric tube by an inner bubble interior exhaust.

14. A process for forming a multi-layered polymeric film tube comprising:
    providing a first source of a first molten polymer,
    providing a second source of a second molten polymer, wherein a characteristic of the first molten polymer differs from a characteristic of the second molten polymer,
    extruding the first molten polymer from an outer die lip of an extrusion die, wherein an outer polymeric film tube is formed, the outer polymeric film tube having an outer frost line,
    extruding the second molten polymer from an inner die lip of the extrusion die, wherein an inner polymeric film tube is formed, the inner polymeric film tube having an inner frost line, wherein the inner die lip is surrounded by the outer die lip and the inner frost line is at a different height than the outer frost line, directing cooling fluid onto an interior of the outer polymeric film tube and an exterior of the inner polymeric film tube, and collapsing the outer and inner polymeric tubes so that the tubes are placed into intimate contact with each other.

15. The process of claim 14 further comprising:

the inner die lip at a higher elevation than the outer die lip.

16. The process of claim 14 further comprising:

the height of the outer frost line lower than the height of the inner frost line.

17. The process of claim 14 further comprising:

extruding a first molten polymeric stream by a first extruder, splitting the first molten polymeric stream into a second polymeric stream and a third polymeric stream, and mixing at least one additive to the second polymeric stream by a static mixer, wherein the second polymeric stream provides the first molten polymer and the third polymeric stream provides the second molten polymer.

18. The process of claim 14 further comprising:

the first molten polymer comprising a different color than the second molten polymer.

19. The process of claim 14 further comprising:

directing cooling fluid onto an interior of the inner polymeric film tube, and exhausting cooling fluid from the interior of the inner polymeric film tube.

20. The process of claim 14 further comprising:

the cooling fluid directed onto the interior of the second polymeric tube and the exterior of the first polymeric tube supplied by a single cooling source, and exhausting the cooling fluid from the interior of the second polymeric tube and the exterior of the first polymeric tube.

* * * * *